United States Patent [19]

Schimming

[11] 4,096,638
[45] Jun. 27, 1978

[54] PENDULUM

[75] Inventor: Fred H. Schimming, Pea Ridge, Ark.

[73] Assignees: Roland Clardy; Ray Green, Rogers, Ark. ; part interest to each

[21] Appl. No.: 755,623

[22] Filed: Dec. 20, 1976

[51] Int. Cl.² .............................................. G01C 9/12
[52] U.S. Cl. ......................................... 33/396; 33/378
[58] Field of Search ........................... 33/378, 391, 396

[56] References Cited

U.S. PATENT DOCUMENTS

| | | | |
|---|---|---|---|
| 1,220,407 | 3/1917 | Fogelsong | 33/396 |
| 1,399,423 | 12/1921 | Cunningham | 33/396 |
| 1,600,855 | 9/1926 | Stevens | 33/391 |
| 1,855,664 | 4/1932 | Budge | 33/396 |
| 1,924,761 | 8/1933 | Turner | 33/396 |
| 2,722,056 | 11/1955 | Stimler | 33/396 |
| 3,945,391 | 3/1976 | Pearse | 33/396 X |

*Primary Examiner*—Charles E. Phillips
*Attorney, Agent, or Firm*—Clarence A. O'Brien; Harvey B. Jacobson

[57] ABSTRACT

A support body is provided defining a first pair of sides, a circular recess in the body opening outwardly of the first pair of sides and a second pair of sides for abutting against a surface whose orientation relative to the horizontal is to be measured. A level element is adjustably, rotatably disposed in the recess and defines a hollow housing having opposite sides including at least one outer side facing outwardly of the recess. The opposite sides include central journal bearing structures and the opposite ends of a support shaft are journaled from the journal bearing structures. A weighted pendulum-type upstanding pointer arm has a midportion thereof supported from the shaft and includes an upper end indicator or portion swingable in close proximity to the inner surface of the outer periphery of the outer side of the housing, the outer periphery being constructed of transparent material and provided with peripherally spaced indicia. The shaft further includes a support arm disposed generally normal to the pointer arm and extending outwardly of opposite sides of the shaft. The opposite ends of the support arm include float bodies and the interior of the housing is filled with a liquid to a level at which the float bodies are buoyed up by the liquid with a force slightly less than the combined weight of the shaft, the pointer and support arms and the float bodies, taking into consideration those portions of the latter which are totally or partially submerged within the liquid. In this manner, the journal bearing structures support only a small fraction of the total weight comprising the shaft and the various components supported therefrom and thereby function primarily to guide the shaft and its supported components.

2 Claims, 6 Drawing Figures

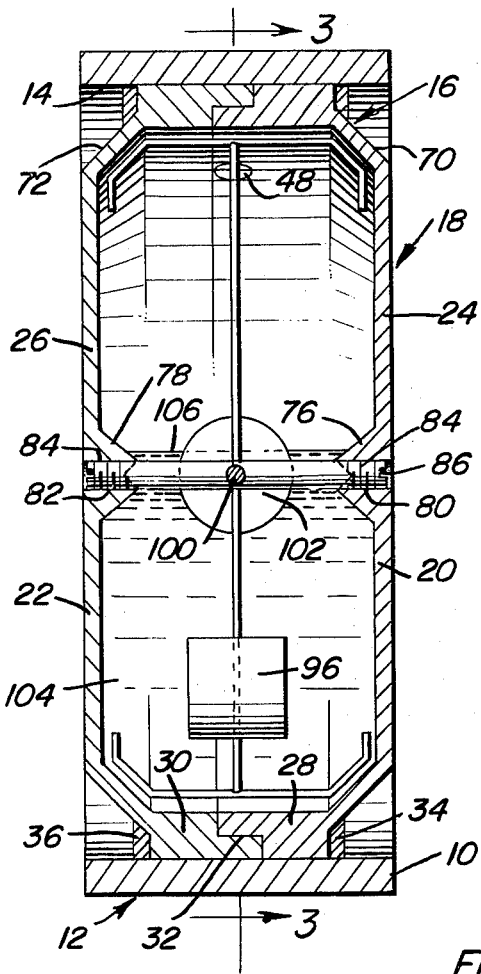
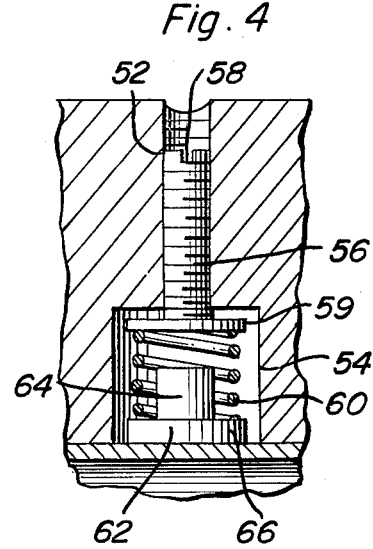
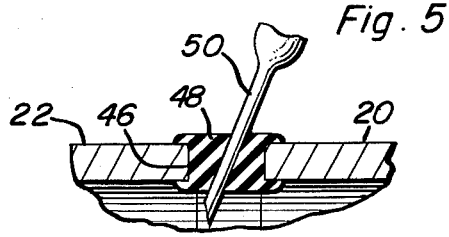
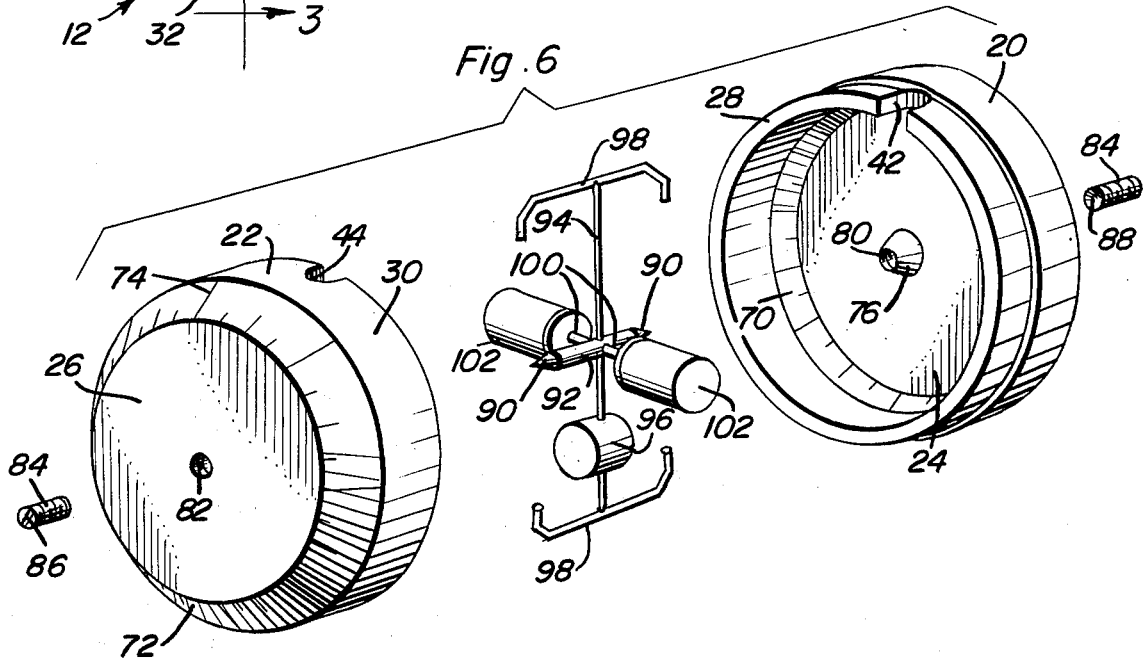

PENDULUM

BACKGROUND OF THE INVENTION

Many different forms of levels have been heretofore provided for indicating both vertical and horizontal reference lines or planes. Some forms of levels incorporate spirit levels which may not be adjusted to indicate reference lines or planes other than vertical and horizontal reference lines and planes and other levels utilize pendulum-type structures which may or may not be adjustable to indicate reference lines or planes other than vertical and horizontal reference lines and planes. However, pendulum-type levels are subject to wear and/or binding in the journal portions thereof which can cause erroneous readings and most forms of pendulum-type levels are time consuming in use inasmuch as the pendulum portions thereof must be allowed to "coast" to a stationary position before an indication of the level may be read.

Various forms of levels including some of the general structural and operational features of this instant invention are disclosed in U.S. Pat. Nos.: 683,788, 689,323, 1,855,664, 1,992,675, 2,952,920 and 2,990,622.

BRIEF DESCRIPTION OF THE INVENTION

The level of the instant invention utilizes a sealed housing in which a pendulum-type indicator is pivotally supported. However, the pendulum-type indicator is provided with opposite side float elements or bodies and the interior of the housing in which the pendulum-type indicator is pivotally supported has a quantity of liquid disposed therein to a level whereby the float elements or bodies buoy up substantially all of the weight of the pendulum indicator. In this manner, the bearing structures which support the pendulum indicator for oscillation do not function primarily as supports for the pendulum indicator, but merely as guides for the pendulum indicator. The pendulum indicator is weighted to assume a vertical position by gravity, but the weighted portion of the indicator is submerged within the liquid carried within the housing and thereby acts as a damper to oscillatory movements of the pendulum indicator.

The main object of this invention is to provide a highly accurate pendulum-type indicator for use in a level and with the pendulum-type indicator being of a construction whereby its oscillatory movements are dampened and the journal bearings which guide the pendulum indicator for oscillatory movement are required to supply only a small fraction of the weight of the pendulum indicator.

Another object of this invention is to provide a level construction which may be readily adjusted so as to indicate reference lines or planes which are other than vertical or horizontal.

Another very important object of this invention is to provide a pendulum-type indicator for a level which may be readily incorporated into the manufacture of present day levels.

A final object of this invention to be specifically enumerated herein is to provide a level in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a transverse, vertical, sectional view on somewhat of an enlarged scale taken substantially upon a plane indicated by the section line 2—2 of FIG. 1;

FIG. 4 is a fragmentary, sectional view on an enlarged scale taken substantially upon the plane indicated by the section line 4—4 of FIG. 3;

FIG. 5 is a fragmentary, sectional view illustrating the manner in which liquid within the housing portion of the pendulum indicator may have additional liquid added thereto or a small amount of liquid extracted therefrom; and FIG. 6 is an exploded, perspective view of the pendulum indicator.

DETAILED DESCRIPTION OF THE INVENTION

Figure 1:
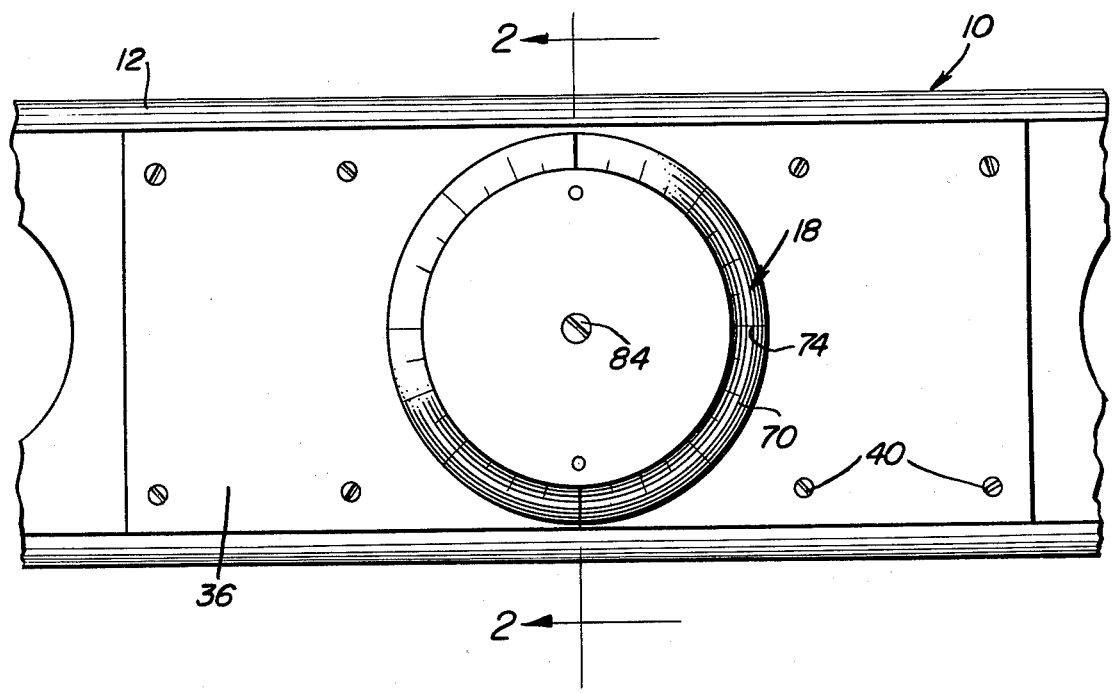
FIG. 1 is a fragmentary, perspective view of a level incorporating the pendulum-type indicator therein.
Figure 3:
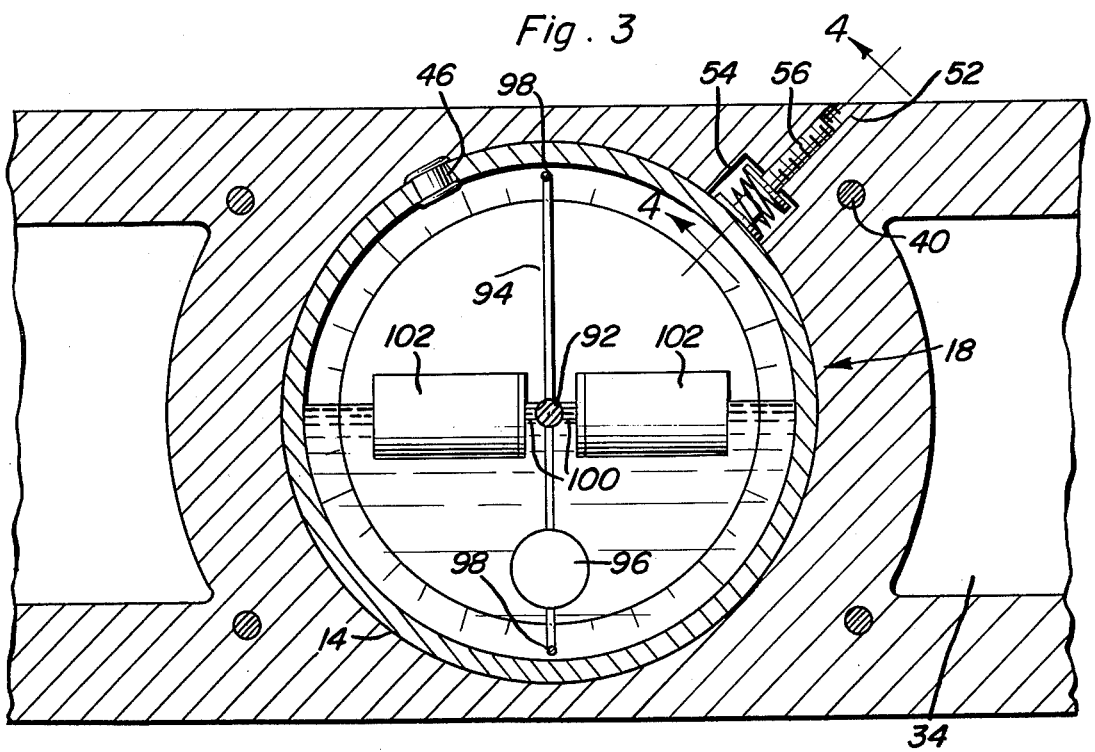
FIG. 3 is a vertical, sectional view taken substantially upon the section line 3—3 of FIG. 2 and on somewhat of a reduced scale.

Referring now more specifically to the drawings, the numeral 10 generally designates a level constructed in accordance with the present invention. The level 10 includes an elongated beam-type body 12 of generally I-shaped cross section having first and second pairs of opposed sides with cylindrical opening 14 formed through the first pair of sides and the second pair of sides serving as work abutting surfaces.

A pendulum-type indicator is referred to in general by the reference numeral 16 and includes a hollow housing 18 consisting of a pair of housing end sections 20 and 22 opening toward each other. The end sections 20 and 22 define opposite end walls 24 and 26 of the housing 18 and the sections 20 and 22 include cylindrical wall portions 28 and 30 extending about the outer peripheral portions of the end walls 24 and 26 and which project toward each other and are interfitted and sealed together as at 32 to define a closed housing of generally cylindrical configuration.

The cylindrical housing 18 is snugly but rotatably received in the opening or bore 14 and a pair of retaining plates 34 and 36 are secured to opposite sides of the center portion of the body 12 by means of fasteners 40 secured through the plates 34 and 36 and the body 12. The plates 34 and 36 overlie the remote sides of the outer periphery of the housing 18 and thereby removably lock the housing 18 within the opening 14 against axial displacement therefrom.

Corresponding portions of the opposing ends of the cylindrical peripheral wall portions 28 and 30 are provided with registered notches 42 and 44 which together define a port 46 opening radially into the interior of the housing 18. A puncturable self resealable resilient plug 48 is anchored within the port 46 and may be repeatedly pierced by means of a hollow needle 50 in the manner illustrated in FIG. 5 without destroying the sealed condition of the housing 18 when the needle 50 is withdrawn.

The body 12 further includes a threaded bore 52 formed therein extending generally radially of the opening 14 and including a diametrically enlarged inner end counterbore 54. An abutment screw 56 including an outer end screw driver kerf 58 is threaded in the bore 52 and includes a diametrically enlarged head portion 59 disposed within the counterbore 54. A compression spring 60 is disposed in the counterbore 54 with one end thereof abutted against the diametrically enlarged head 59 and a friction abutment piston 62 including a shank portion 64 telescoped into the end of the spring 60 remote from the head 59 is disposed in the counterbore 54 and includes an enlarged head 66 frictionally engaged with the outer periphery of the housing 18 for frictionally retaining the latter in adjusted rotated positions within the opening 14.

The end walls 24 and 26 include beveled outer peripheral portions 70 and 72 provided with indicia 74 spaced thereabout and the central portions of the end walls 24 and 26 are thickened, as at 76 and 78, and have threaded bores 80 and 82 formed therethrough. Threaded bearing pins 84 are threadedly engaged in the bores 80 and 82 and include outer end screw driver kerfs 86 and inner end conical recesses 88 facing toward each other and in which the remote conical terminal ends 90 of a pivot shaft 92 are journaled.

The pivot shaft 92 includes a generally diametric pointer arm 94 extending therethrough having an enlarged weight 96 on one end and a pair of transverse indicator portions 98 on its opposite terminal ends. The indicator portions 98 swing in close proximity to the inner surfaces of the beveled outer peripheral portions of the end walls 24 and 26 and the pivot shaft 92 includes a pair of opposite side aligned support arms 100 supported therefrom and disposed substantially normal to the pointer arm 94. The outer ends of the support arms 100 have float bodies 102 supported therefrom and the interior of the housing 18 is filled with a liquid 104 to a level 106 slightly above a horizontal diameter of the housing 18. The liquid 104 may comprise any suitable liquid having at least some bearing lubricating properties and which will not readily vaporize at elevated temperatures and freeze at lower temperatures. The float bodies 102 are partially submerged in the liquid 104 and are thus buoyed upwardly thereby. The buoyancy effect of the liquid 104 on the float bodies 102 is such that all but a small fraction of the total weight of the pendulum indicator including the components 92, 94, 96, 98, 100, and 102 is buoyed up by the liquid 104. Accordingly, the bearing pins 84 are required to support only a small fraction of the total weight of the pendulum indicator and function primarily as guides for oscillation of the pendulum indicator relative to the housing 18. Thus, the bearing surfaces 88 and 90 which are disposed below the level 106 of the liquid 104 and are thereby lubricated by the latter, offer little resistance to oscillation of the pendulum indicator relative to the housing 18 and offer trouble free functioning of the level 10.

If it is desired, additional quantities of the liquid 104 may be admitted into the housing 18 through the needle 50. Also, small quantities of the liquid 104 may be removed from the housing 18 by means of the needle 50. Of course, at any time it is necessary to add or delete liquid, the housing 18 must be removed from the body 12 by removal of one of the plates 34 and 36 and by backing out on the screw 56. Further if it is desired to measure slight variances in an inclined surface, the housing 18 may be rotated relative to the body 12 and secured in adjusted rotated position by means of the abutment piston 62 and thereafter the pendulum indicator may render direct readings of the inclined surface as indicated by the indicator portions 98 registering with the indicia 74. In addition to the adjustability of the angular displacement of the housing 18 relative to the body 12, the utilization of the float elements 102 to buoyed up substantially all of the weight of the pendulum indicator in the liquid 104 and the fact that the floats 102 coact with the weight 96 to enable the pointer arm to assume a vertical position comprise important aspects of the instant invention. Still further, the weight 96 functions to dampen oscillations of the pendulum indicator within the housing 18 by the resistance to movement of the weight 96 through the liquid 104 and the interior of the housing 18 may be illuminated through the wall portions 28 and 30 thereof by illumination means mounted within the body 12 and communicated with the opening 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows.

1. A level comprising a body defining first and second pairs of opposite sides and a cylindrical opening in said body extending between and opening outwardly of said first pair of sides, said second pair of sides being adapted for selective abutting against a surface whose orientation relative to the horizontal is to be measured, a level assembly disposed in said opening, said level assembly including a sealed hollow housing having opposite sides facing outwardly of said first pair of sides, journal means carried by central portions of said housing sides, indicator means including a horizontal shaft extending between and journaled from said journal means and pointer arm means carried by and projecting outwardly from at least one side of said shaft and including outer end provided with indicator means closely adjacent and swingable about the inner surfaces of the outer peripheries of said housing sides, said housing sides including indicia spaced about said outer peripheries with which said indicator means is registrable, second arm means carried by said shaft and projecting outwardly from opposite sides thereof, the outer ends of said second arm means including float elements spaced along said second arm means in a line normal to a diametric plane of said shaft containing said indicator means, a quantity of liquid contained within said housing to a level with said float elements disposed in said liquid and buoyed up thereby with a force substantially to the weight of said indicator means, whereby the shaft ends and journal means function primarily to guide the indicator means during its oscillation rather than support of the indicator means between said housing sides, said float elements coacting with liquid to support said pointer arm means in vertical position, said housing including a pair of aligned cylindrical opposite end sections with said opposite sides of said housing closing the remote ends of said sections, the adjacent ends of said end sections being oppositely and complementary stepped and interfittingly and sealingly secured together, corresponding peripheral portions of said adjacent ends having registered notches formed therein opening toward each other and defining a port through the corresponding outer peripheral wall portion of said housing centrally intermediate its opposite ends, a puncturable resillient plug extending through said port and overlapping the inner and outer surfaces of said corresponding peripheral wall portion, said plug being constructed of a material rendering said plug repeatedly puncturable by a hollow needle and self resealable each time the needle is withdrawn, said housing being removably and rotatably received in said body opening, said body having a bore formed therein extending generally radially of said cylindrical body opening and opening outwardly of one of said second pair of sides of said body at its outer end and into said body opening at its inner end, the inner end of said bore including a diametrically enlarged counterbore, the outer end of said bore being threaded, an abutment screw threaded in said outer end of said bore and including an inner end head loosely received in said counterbore, an abutment piston disposed in said counterbore, and a compression spring interposed between said head and abutment piston, said abutment piston being projectable, at least slightly, from said counterbore into said body opening for frictional abutting engagement with the opposing outer surface portion of said housing.

2. The combination of claim 1 wherein said journal means define opposing conical sockets and the ends of said shaft are conical and rotatably received in said sockets, said journal means comprise aligned pins threaded through said housing sides, said sockets being formed in the adjacent ends of said pins.

* * * * *